(12) United States Patent
Borosak

(10) Patent No.: US 8,309,926 B2
(45) Date of Patent: Nov. 13, 2012

(54) PULSED-LASER BEAM DETECTOR WITH IMPROVED SUN AND TEMPERATURE COMPENSATION

(76) Inventor: Marko Borosak, Zagreb (HR)

(*) Notice: Subject to any disclaimer, the term of this patent is extended or adjusted under 35 U.S.C. 154(b) by 456 days.

(21) Appl. No.: 12/740,877

(22) PCT Filed: May 2, 2008

(86) PCT No.: PCT/HR2008/000015
§ 371 (c)(1),
(2), (4) Date: Apr. 30, 2010

(87) PCT Pub. No.: WO2009/133414
PCT Pub. Date: Nov. 5, 2009

(65) Prior Publication Data
US 2010/0264301 A1 Oct. 21, 2010

(51) Int. Cl.
*G01J 5/00* (2006.01)
(52) U.S. Cl. ................ 250/338.1; 73/204.19
(58) Field of Classification Search ............ 250/338.1; 73/204.19
See application file for complete search history.

(56) References Cited

U.S. PATENT DOCUMENTS

| | | |
|---|---|---|
| 5,359,404 A | 10/1994 | Dunne |
| 5,471,215 A | 11/1995 | Fukuhara et al. |
| 5,612,779 A | 3/1997 | Dunne |
| 5,926,260 A | 7/1999 | Dunne et al. |
| 6,297,732 B2 | 10/2001 | Hsu et al. |
| 6,347,120 B1 | 2/2002 | Sakoda |
| 6,512,574 B2 | 1/2003 | Lai et al. |
| 6,636,536 B1 * | 10/2003 | Tisue ........................... 372/20 |
| 6,833,910 B2 | 12/2004 | Bøgh-Andersen |
| 7,907,266 B1 * | 3/2011 | King et al. ................... 356/213 |
| 2010/0191506 A1 * | 7/2010 | Chyba et al. ................ 702/182 |
| 2011/0190641 A1 * | 8/2011 | Tateishi et al. .............. 600/479 |
| 2011/0291578 A1 * | 12/2011 | Philippbar et al. .......... 315/224 |

FOREIGN PATENT DOCUMENTS

| | | |
|---|---|---|
| DE | 101 59 932 A1 | 6/2003 |
| EP | 0 745 868 A1 | 12/1996 |
| EP | 0 856 943 A2 | 8/1998 |
| EP | 1 006 591 A2 | 6/2000 |
| WO | WO 97/21110 | 6/1997 |
| WO | WO 2007/030700 A2 | 3/2007 |

OTHER PUBLICATIONS

International Search Report and Written Opinion for PCT International Application No. PCT/HR2008/000015 mailed Sep. 3, 2008.

* cited by examiner

*Primary Examiner* — Christine Sung
(74) *Attorney, Agent, or Firm* — RatnerPrestia

(57) ABSTRACT

A pulsed-laser beam detector with improved sun and temperature compensation. The detector includes a plurality of photo detectors, an ambient temperature sensor, a sun exposure filter and a mirroring circuit, a microcontroller unit that includes pre-stored values in a database and an algorithm—decision logic, a time base circuit that feeds microcontroller, an adjustable gain amplifier, a threshold setting circuit, a peak detector circuit, a comparator circuit, and a noise cancellation circuit. The gain of the amplifier is adjustable in real time to predetermined values, and the gain depends on the measured values from the detectors, and temperature sensor, that are preprocessed if necessary, and compared with the values already stored in the microcontroller unit and subjected to the program logic stored in the microcontroller that determines the gain of the amplifier.

5 Claims, 5 Drawing Sheets

PULSED-LASER BEAM DETECTOR WITH IMPROVED SUN AND TEMPERATURE COMPENSATION

This application is a U.S. National Phase Application of PCT International Application No. PCT/HR2008/000015, filed May 2, 2008.

FIELD OF INVENTION

Invention relates to improved pulsed-laser beam detectors with enhanced sensitivity of detection of incoming beam.

SUMMARY OF INVENTION

The present invention relates to the method and apparatus for detecting pulsed-laser signals emitted from a foreign source or a reflections of the own emitted signals within varying ambient temperature and varying sun exposure levels. The preferred embodiment describes the optical pulsed-laser detector wherein the optical signal is converted to an electrical signal in plurality of photodiodes. Said electrical signal is amplified in series of amplifiers with adjustable gain that is simultaneously controlled by the microcontroller. Said microcontroller has stored in its database various gain output values for the various environment conditions. The microcontroller has been connected with the ambient sensors; i.e. with the sun exposure sensor and the temperature sensor. In addition, the said microcontroller has been equipped with the database of pre-stored values for different sun exposure levels and ambient temperature. The microcontroller adjusts the gain of the amplifier according to the pre-stored values and measured time laps in input occurrences via stored algorithm.

PREVIOUS STATE OF ART

A common type of a pulsed-laser device is one that emits a powerful and very short laser beam pulse (in the time range from 1 ns to several 100 ns) and that detects the reflection from the object of measurement to the pulsed-laser operator's location.

By using a precise timing mechanism which measures the time of flight (TOF) of the emitted laser pulse to its return as a reflection from the target it is possible to measure all of a kinematics variables such as distance, speed and acceleration using by using the speed of light constant. These devices are also known as LIDAR-s (Laser Detection And Ranging).

By using a plurality of sequential laser beam pulses the pulsed-laser device that also utilizes a processor and a memory for storing measured distance values over time it is possible to calculate the target speed, acceleration and other functions (cf. U.S. Pat. No. 5,359,404 Dunne).

Since such a devices needs to detect targets at largest ranges possible (several km) their laser emitters need to send the strongest possible laser pulse and their receivers need to have the highest possible sensitivity. That implies use a semiconductor laser diodes of up to 100 W of optical output power and an avalanche photo diode in the receiver to increase the sensitivity.

In most cases such devices need also to be operator and observer safe. With that respect a great deal of care must be taken to the eye safety. Devices that are understood to be completely eye safe those classified as Laser class 1 or 1M. Limits of this class for the power of the emitted laser pulse are problem for pulsed-laser designs in regard to the maximum achievable range to the target. When their limited emitted power such devices need to resort to heightening the sensitivity of their receiver to obtain improvements in range.

The art of detecting a weak pulsed-laser signal is not the same in outdoor and indoor environment, at night and during the day. Sun radiation greatly affects the pulsed-laser receivers since it radiates enormous power on broad range of wavelengths. Many pulsed-laser devices operate on 905 nm wavelength being invisible to the human eye and often use the wavelength filters to narrow the spectre of signals coming in to their receiver. While this method completely filters out foreign laser sources operating on different wavelengths (such as 1600 nm) it helps little to reduce the saturation of the receiver exposed to the sunlight since the Sun radiates at 905 nm wavelength as well.

Prior art pulsed-laser signal detectors resolve the mentioned problem by implementing a noise reduction and noise averaging schemes at the general level.

A preamplifier element in the pulsed-laser beam detection devices is usually a bipolar transistor, junction FET or MOSFET transistor. These elements have good noise characteristics and high gain. However their gain is dependant on the operating temperature. Prior art pulsed-laser signal detectors have compensated these temperature deviations by implementation of a feedback loop to the transistor or by sacrificing some sensitivity by exchanging the transistor with an already compensated element such as the operational amplifier.

Besides the mentioned pulsed-laser (LIDAR) devices, there are present devices intended for detecting the beam of a LIDAR device (LIDAR detectors), i.e. (U.S. Pat. No. 5,347,120 DECKER, POSTON) and even countering the performance of a LIDAR device by emitting a jamming pulsed-laser signal after detecting a LIDAR pulsed-laser signal (LIDAR jammer, WO9721110 LAAKMANN, ZHANG; U.S. Pat. No. 6,833,910 BOGH-ANDERSEN).

LIDAR detectors and LIDAR jammers need to have even greater receiver sensitivity since they need to be able to detect a LIDAR beam directed at a nearby building or a nearby vehicles and not only at themselves. Optical power of a pulsed-laser (LIDAR) beam is strongest in the centre of the beam (in its focus) and greatly reduces when moving away from its centre. The rate of reduction depends on the strengths and quality of used lenses in the LIDAR and the desired beam angle of the LIDAR (usually about 4 mrad). With this in mind it becomes clear that it is very difficult to detect a common pulsed-laser beam aimed just a few feet away from the receiver.

The index of reflection greatly attenuates the reflected optical power unless the surface is a mirror or optical material with the similar property. The art of detecting of reflected pulsed-laser beam on a nearby object also requires high sensitivity of the receiver.

By analyzing the U.S. Pat. No. 5,347,120 DECKER, POSTON; LIDAR detector we notice the usual components of the pulsed-laser detector circuit such as photodiodes for converting the optical to electrical signal, plurality of signal amplifiers, noise averaging element and noise detector circuits. In Addition to the ordinary components there is the decision network which counts occurrences of pulsed-laser signals in time. If pulsed-laser signal occurrences are determined to be of a particular type (according to the parameters) the device activates an alarm for the user.

The schematic design consists of bipolar transistors in the preamplifier circuit with a feedback loop but without the sun exposure compensation or the efficient temperature compensation.

The U.S. Pat. No. 6,297,732 HSU; RADAR/LASER DETECTION DEVICE have not disclosed the Laser (LI- DAR) detection circuitry while there is present an external sensors module. By reading the description of the invention it is revealed that the external sensor module is providing compass, temperature, wind and altitude information but that this information were collected for the user of the said device only and is not used in the Laser Detection Circuitry at all.

The U.S. Pat. No. 6,512,574 LAI; LIGHT RECEIVING CIRCUIT OF LASER RANGE FINDER discloses the complete receiver circuit for detection of pulsed-laser signals. It comprises the usual pulsed-laser detector components such as a photodiode (or APD), plurality of amplifiers and One-Shot A/D converter. The description teaches that LIDAR "needs to increase the transmitted laser power as much as possible or to remove the noise induced by the sunlight in the optical receiver". Like previous inventions this one also relies only on removing the noise induced by the sun after the signal amplification.

The U.S. Pat. No. 5,612,779 DUNNE; AUTOMATIC NOISE THRESHOLD . . . , we find circuits for transmitting and receiving of pulsed-laser signals with the automatic threshold adjustment circuit. The automatic threshold circuit (ATC) heightens or lowers the threshold of the pulsed-laser receiver where the said threshold depends of the noise found in the receiver output that is connected to it. The ATC is a linear unit that changes the reception threshold as the noise value changes linearly. If the sun exposure level would be separately monitored, that is the case with the present invention, the ATC in U.S. Pat. No. 5,612,779 would give even better results.

Documents WO9721110 LAAKMANN, ZHANG; Laser transponder (LIDAR jammer) and a U.S. Pat. No. 6,833,910 BOGH-ANDERSEN, Laser transponder (LIDAR jammer) describe the device that is a counter-measure to the pulsed-laser distance/speed meters. The photodiode in the receiver of the WO9721110 is directly connected to the operational amplifiers and the gain temperature compensation in this stage is not necessary—but surly lower SNR ratio. The sun exposure level has not been present. The photodiode in the receiver of the U.S. Pat. No. 6,833,910 is connected to a chain of preamplifiers with bipolar transistor. The feedback loop is present but it is unlikely that the temperature variation in gain could be compensated completely. The sun exposure level is absent.

The last document—U.S. Pat. No. 5,926,260 DUNNE, Laser based distance measuring apparatus, describes the pulsed-laser LIDAR. It is shown that the central microprocessor is controlling the gain of the amplifiers in the pulsed-laser signals receiver. It is noticeable that there is no direct input from the photodiodes or the preamplifiers to the microprocessor so the said microprocessor is unable to determine the level of the sun exposure. The description teaches that the processor is controlling the amplifiers to enable various user selectable electronic filter modes used supposedly to reject spurious signals in the receiver and to filter out false readings acquired on less reflective targets. Receiver circuitry has not been disclosed.

The present invention overcomes the observed defects in the cited documents in the segment of sun and temperature effects compensation.

DETAILED DESCRIPTION OF THE INVENTION

A pulsed-laser beam detection circuit has been disclosed. Bellow are underlined definitions of the invention parts and corresponding short explanation of their technical functions.

The plurality of photo-detectors convert the optical signal and optical sun exposure level to an electrical signal and an electrical sun exposure voltage level.

The temperature sensor converts the ambient temperature to an electrical temperature voltage value.

The amplification means are used to amplify the electrical signal. Said amplification means has a controllable gain controlled by the computing means.

The computing means are used to process the sensor and timer information and according to the logic (built in algorithm) to control the amplifier gain trough the use of gain control means.

The aim of gain control means is to convert the digital gain control signal of the computing means to an electrical signal of appropriate value that have to adjust the amplifier gain.

The Filtering and the conditioning means are used to prepare the electrical sun exposure voltage to be analysed by the said computing means.

The converter means are used to convert the conditioned electrical sun exposure voltage level and electrical temperature voltage value to digital format that is processed in the computing means.

The clock timer means are utilized by the computing means to give the time reference of the monitored event occurrences.

The storage means are provided for storing, reading and writing data such as previously said digital sun exposure level, temperature value, time of event occurrences and a plurality of other variables, constants and database data.

The database means are used to provide comparator limits for the sun exposure metering and temperature metering and to provide corresponding gain control values and gain control modifiers to the said sun exposure levels and temperature values.

The logic means are employed to compare the measured sun exposure level and temperature value with the database limits and to change the gain of the amplifier according to the corresponding values and modifiers.

An algorithm means are used with logic means to compare the time of the events occurrences and according to the algorithm result prevent unnecessary alterations of the gain control signal and thus avoid false triggering of the receiver.

Noise threshold setting means are used to average the noise in the electrical signal and to set the threshold level to a fixed percentage above the average noise value.

Signal peak detecting means are used to wide the duration of the received optical signal pulse for the comparator.

The comparator means generate a logic output that increases when an optical signal is received that posses greater a n amplitude above the pre-set threshold.

Multivibrator monostable means additionally wide the logic signal and also prevent possible re-triggering oscillations.

Figure 1:
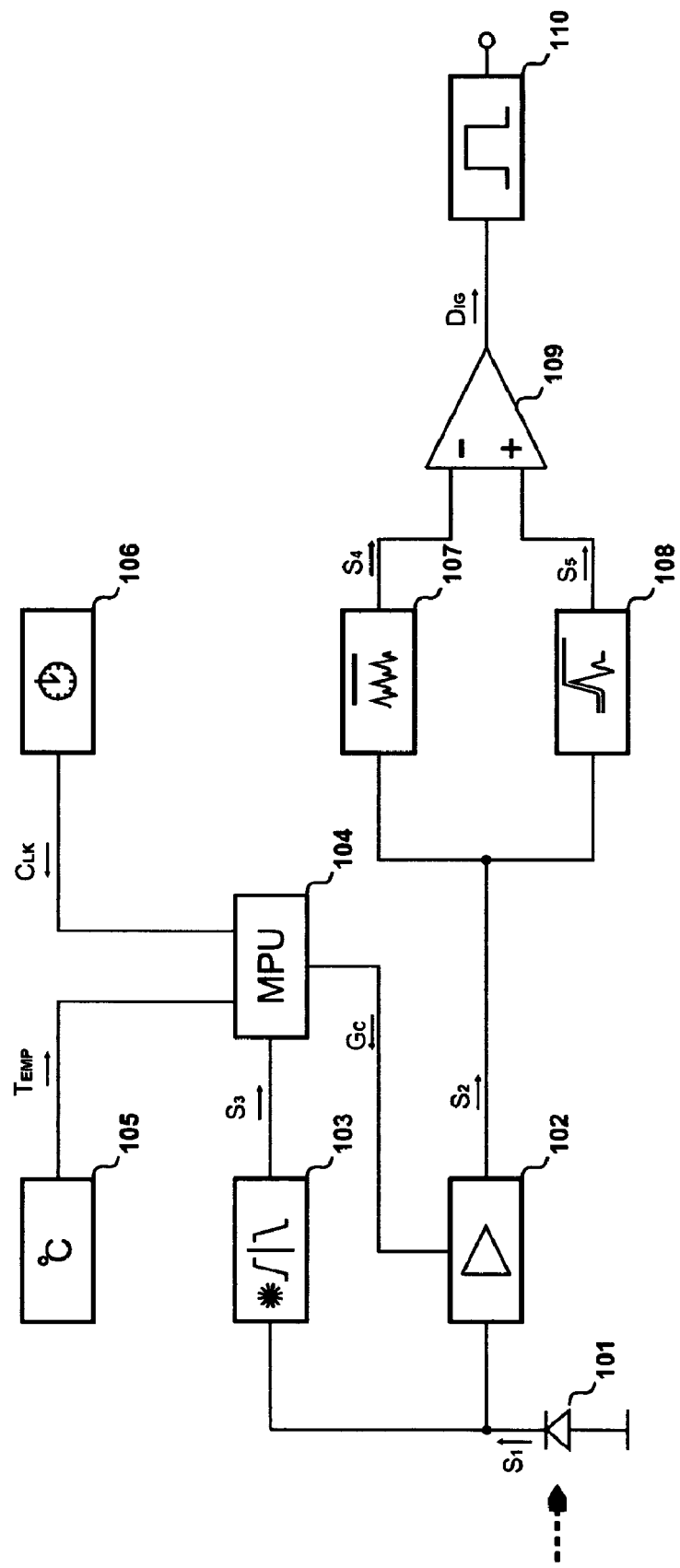
FIG. 1 shows a block diagram of the receiver circuit showing how a microcontroller is monitoring ambient parameters and controlling the amplification gain.

The primary objective of the present invention is to enable a construction of laser range finders and other LIDAR devices with improved range and better immunity to sunlight and background light trough the use of presented pulsed-laser receiver circuit.

Additionally the presented pulsed-laser receiver circuit is to be used in a detector of foreign pulsed-laser beams directed at a person, vehicle or an object thus comprising a counter-measure to the pulsed-laser device. Such counter-measures that comprise the presented receiver circuit will obtain greater sensitivity and be able to detect very low powered pulsed-laser devices, or even a reflection of a pulsed-laser devices aimed at surrounding persons, vehicles or objects. The counter-measure devices that would benefit could be pulsed-laser beam detectors only or pulsed-laser beam detectors with jamming capabilities.

Described pulsed-laser beam receiver circuit is likely to be first one that has embedded a dedicated microcontroller unit with complex algorithm and a database of values for different sun exposure levels. In addition, the invention posses pre-stored different digital gain control output values that are converted to an analog signal by the digital to analog resistor converter and which then feed the gain control input of the preamplifiers. Said programmed component and its algorithm are able to detect various mode of use—that depend of the sun exposure level such as indoors, outdoors, cloudy day, clear day, night or day—and then to compensate the receiver accordingly.

This is achieved not only by monitoring the sun exposure level but also by monitoring the time laps of the sun exposure peak occurrences and deducing the most likely operating ambient based on those values.

Temperature sensor connected to the microcontroller also enables the monitoring of the operating temperature and compensating the gain of the preamplifiers accordingly. In the database of the microcontroller different temperature levels are stored and for each a corresponding receiver gain compensation value is stored.

These values have been previously calibrated and stored to achieve a linear response of the receiver in wide range of operating temperatures.

Programmed algorithm in the microcontroller assures that the temperature compensation and sun exposure compensation work simultaneously and optimally.

Other device that may integrate the presented circuit would be a laser based collision avoidance system. Such system is basically a pulsed-laser distance meter but for its specific use it could use wider angle laser beam or a plurality of pulsed-laser devices for covering a wider angle. Similarly the present invention can be used as a laser based parking assistant device where the main difference is in the interested range to the target.

Pulsed-laser devices presented with this invention relates to ones that usually emit an output pulse with the duration range from 10 to 100 ns and with the constant or varying repetition of those emissions. The said repetition frequency is usually between 0.1 to 12500 pulses per second (pps). In cases of varying repetition it is usually a known sequence of fixed frequencies exchanging circularly like a known example of 238 pps and 32 pps frequency exchange. Pulsed-laser device which repetition frequency varies in random and unpredictable manner as are already known in the art (i.e. U.S. Pat. No. 4,359,404, or similar)

In case of the use of present invention as a pulsed-laser parking assistant device or collision avoidance systems it is common for the repetition frequency to be lower. It is known example of a pulsed-laser parking assistant that is emitting a pulsed laser emissions of 40 ns in duration and with repetition frequency of 1 pps but when the object is detected in its proximity the repetition frequency to 4 pps in order to track approaching object more precisely and warn the user accordingly.

Regardless of the repetition frequency that is used the presented receiver circuitry will function equally, i.e. according to the present invention—it will receive optical signals with maximum amplification if a signal pulse width is between 5 and 200 ns. The gain of signals with the pulse widths outside said range will be significantly attenuated.

PREFERRED EMBODIMENT

The circuitry and the functional detail of the proffered embodiment in accordance with the invention will be explained in detail in the following paragraphs.

The FIG. 1 illustrates the block diagram of a pulsed-laser beam detector according to the present invention. A plurality of photo detectors 101 detects an optical signal and converts it into an analog electrical signal. Said analog electrical signal $S_1$ is carrying the sun exposure signal that is later picked by the sun exposure filter and mirror 103 and the same signal has been taken by the amplifier 102. The said amplifier 102 separates the correct pulse width signals and amplifies them producing the signal $S_2$. The sun exposure filter and the mirror 103 extracts the sun exposure offset signal from the $S_1$ signal and mirrors it for the microcontroller unit 104 as a signal $S_3$. The microcontroller unit 104 receives circuit temperature information $T_{EMP}$ from the temperature sensor 105 and time clock information $C_{LK}$ from crystal oscillator 106 beside the signal $S_3$. The said microcontroller 104 is processing data received from all three data inputs $T_{EMP}/C_{LK}$ and $S_3$ and according to the algorithm and the corresponding data retrieved from the database—adjust the amplifier gain control signal $G_C$ that controls the gain of the amplifier 102. Once the signal $S_1$ being amplified into $S_2$ in the amplifier 102 $S_2$ is led simultaneously to the noise threshold setting circuit 107 and a peak detector circuit 108. The peak detector circuit 108 is stretching the peaks in the signal $S_2$ by use of the RC network producing the signal $S_5$. The noise threshold setting circuit 107 averages the signal $S_2$ noise and sets the threshold output signal $S_4$ to a fixed percentage above the average noise. Here is important to notice that percentage when fixed to a lower value will result in increased circuit sensitivity but less immunity to false triggering and when fixed to a higher value will decrease receiver sensitivity but improve the immunity to false triggering. Threshold signal $S_4$ from the noise threshold setting circuit 107 is applied to the comparator 109 (−) input, and the output $S_5$ from the peak detector circuit 108 to the comparator 109 (+) input. The comparator 109 output is in a form of a digital signal $D_{IG}$ that goes high when amplitude of a stretched peak signal $S_5$ is higher than the set threshold signal $S_4$ and vice versa. Pulse width of $D_{IG}$ signal in high state is dependant on the adjustment of the RC network and on the pulse width of the original optical signal. The $D_{IG}$ signal is then applied to the pulse width increasing and noise cancellation monostable circuit 110 input. Once being triggered by the $D_{IG}$ high state the said circuit 110 will output a prolonged digital high state of a fixed pulse width that is now ready for processing by other (here non-disclosed components) of the devices embodiment that are common in the art.

Figure 2:
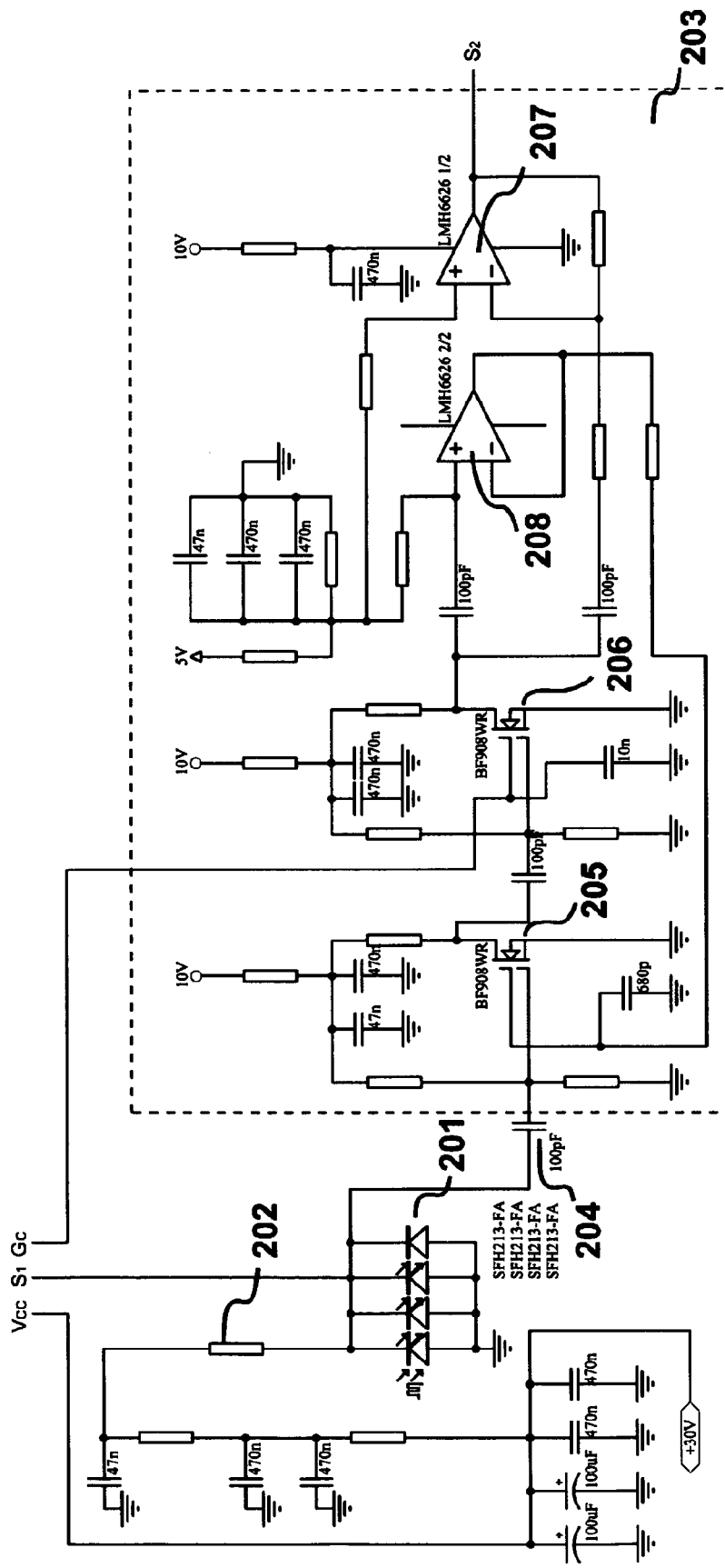
FIG. 2 shows the first stage of the receiver circuit with the photo-detectors, sun exposure metering output, preamplifier stage with gain control input and an amplifier stage.

With reference to FIG. 2 the preferred embodiment will be disclosed in detail. A plurality of photo-detectors 201 are connected in parallel and are biased by the bias resistor 202 to a high bias voltage. Preferred photo-detectors 201 are Osram SFH213FA photodiodes or similar equivalents, because they has a low junction capacitance, fast switching times, good spectral selectivity and high spectral sensitivity. Other types of photodiodes could be used as well. If the bias voltage would be high enough then a photo-detector 201 could be an avalanche photodiode such as the P&E C30817E what would benefit to the receivers sensitivity. A plurality of photo-detectors 201 is used to increase the active surface area and the sensitivity accordingly. However, it is known that adding more photo-detectors in parallel increases total capacitance and parasitic inductances and thus lowers the bandwidth and finally attenuates the signal. In the preferred embodiment four photo-detectors are used as a good balance between sensitivity and bandwidth.

Said photo-detectors 201 are connected to the amplifier 203 by the linking capacitor 204 which removes the offset voltage that corresponds to the sun exposure level and allows only converted optical signals to pass to the amplifier 203. The amplifier 203 is preferably realized with series of gain controlled dual-gate MOS-FET transistors 205 and 206, connected preferably to a second stage with inverting amplifier 207 and the stage for providing a series feedback to the first transistor with an voltage follower amplifier 208. Gain controlled dual-gate MOS-FET transistor such as the Philips BF908WR are chosen because of their low noise, high gain and high bandwidth. The mentioned transistors set a low noise figure for the whole receiver. In addition, the mentioned transistors are gain controllable via changing the voltage applied to their gain control gate-2 input. First BF908WR transistor 205 is providing a 20 dB of gain, its input impedance is set high by the resistor divider and its output is connected to the second BF908WR transistor 206 that is in same configuration but with lower input impedance. Lower input impedance performs a band pass filter that attenuates slower signals. Second transistor 206 is also providing a 20 dB of gain and its gain control gate-2 input is supplied with the gain control signal $G_C$ generated by the microcontroller 303. Second transistor 206 output is connected to the amplifier 208 configured as the voltage follower such as the National LMH6626. The mentioned follower provides an offset voltage and the serial feedback to the first transistor 205 by connection to its gate-2 input that provides widening of the bandwidth of this stage and set the operating point of the first transistor 205.

The second stage is preferably constructed with a inverting amplifier 207 which is also driven by the output of the second transistor 206. Inverting amplifier gain is set to 26 dB by the feedback resistors which also form a second band pass filter for slower signals. Inverting amplifier with enough gain bandwidth such as the National LMH6626 configured as shown on the FIG. 2 will finally output the desired signal $S_2$.

In addition, the purpose of the amplifier 207 is to set the offset voltage for the next stage, and therefore participate in setting the average noise threshold signal $S_4$ as will be described below.

Figure 4:
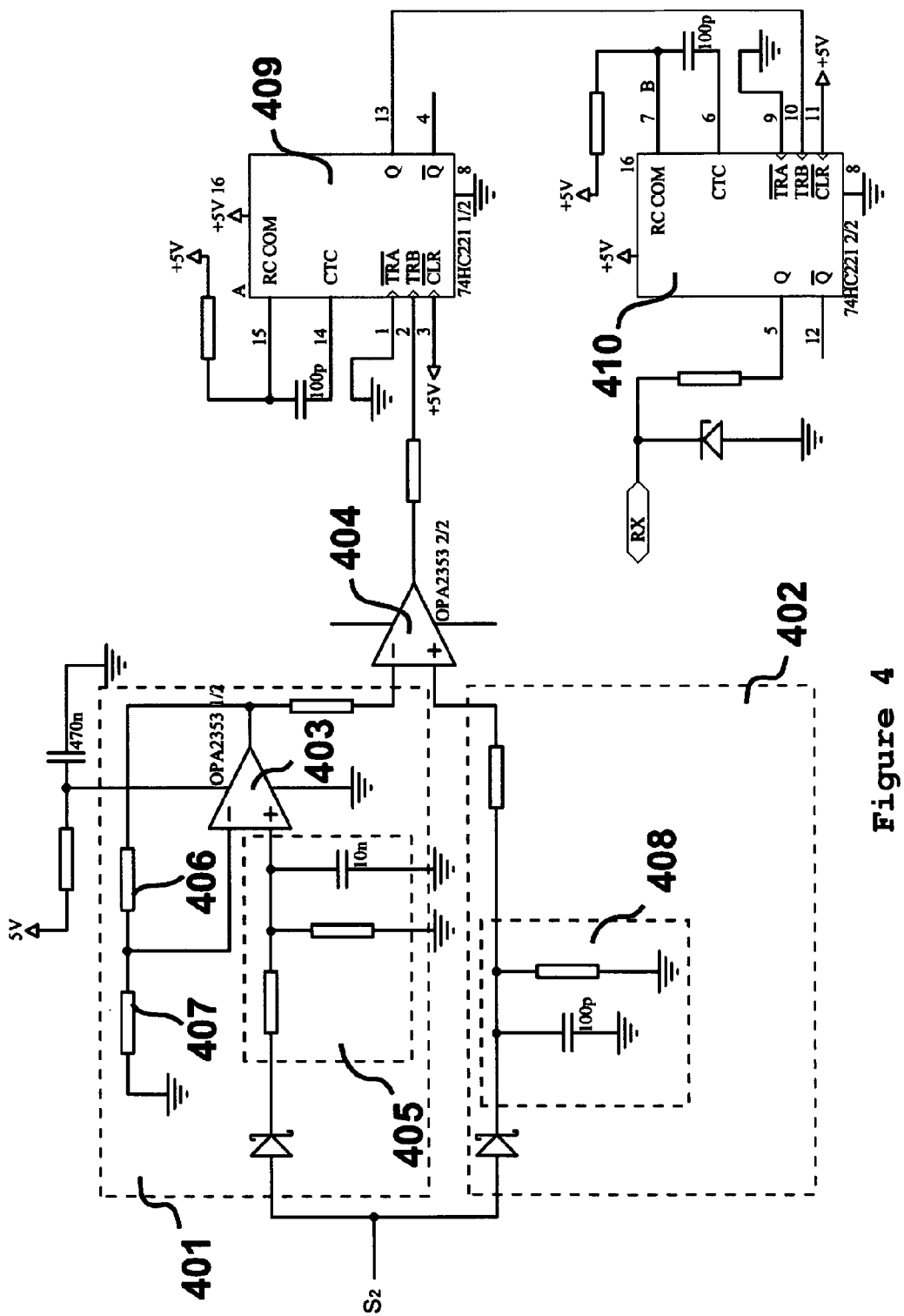
FIG. 4 shows the final stage of the receiver circuit schematic showing a noise averaging circuit, peak detector circuit, and an one-shot A/D (analog to digital) converter.

The signal $S_2$ has been divided on two as shown on FIG. 1 and FIG. 4, one to provide an input signal to the noise threshold setting circuit 107, 401 and to the peak detector circuit 108, 402.

The signal $S_2$ enters trough the RC network 405 where the signal is averaged and summed with the DC offset voltage of the $S_2$ signal and then it is directed to one input of the amplifier 403, where the amplifier can be Texas instruments OPA2353 high-speed operational amplifier. The feedback resistors 406 and 407 connected to the other input of the amplifier 403 set the amplifier gain and thus also the fixed percentage above the average noise threshold signal $S_4$. Noise averaging performed by the RC network 405 will output an additive noise offset voltage. However, it is to expect (on statistical base) that the noise voltage amplitude will reach that voltage in some later time and—if the threshold signal $S_4$ is not set to a fixed percentage above the average noise offset voltage—to produce a false triggering of the receiver output. If a higher fixed percentage is set, than the probability of a false triggering is considerably smaller in time but only higher amplitudes of an optical signal will be detected. On the other hand, if a lower fixed percentage is set, than the probability of a false triggering over desired time period is higher—but receiver sensitivity to the optical signal is also higher.

Another part of the signal $S_2$ is processed to the RC network 408 where the signal peaks are become wider thus creating the signal $S_5$. The mentioned signal $S_5$ enters the following comparator 404 that would output a considerably longer high state on triggering.

Said signals $S_4$ and $S_5$ are then directed to the inputs of the comparator 404 (Texas instruments OPA2353) where crossing of the $S_5$ signal voltage value over the value of the $S_4$ signal voltage will be proceeded in the way that the comparator 404 output will go high (preferably a 5V value as its operating voltage) thus creating the $D_{IG}$ trigger signal. By that action it is considered that a reception of an optical pulsed-laser signal has occurred.

The trigger signal $D_{IG}$ can be used as is by connecting the comparator 404 output to the microcontroller, microprocessor or any other means but in the preferred embodiment additional noise cancellation and pulse widening method is used by connecting the output of the comparator 404 to a monostable pair, preferably connected in series such as the dual Fairchild 74HC221 monostable multivibrator.

Output of the comparator 404 is connected to the input B of the first monostable 409 and output Q of the first monostable is connected to the input B of the second monostable 410. Output Q of the second monostable 410 presents the output of the receiver circuit. First monostable 409 has quasi-stable state set long, preferably to a 30 μs while the second monostable 410 has quasi-stable state set shorter, preferably to 10 μs. The trigger signal $D_{IG}$ triggers the quasi-stable state of the first monostable which in turn triggers the quasi-stable state of the second monostable approx. 50 ns later or a propagation delay time later. The quasi-stable state of the first monostable will still lasta when the quasi-stable state of the second monostable ends so an electrical discharge caused by the change in state from high to low of the receiver output (second monostable output) will not re-trigger the receiver circuit and thus will avoid oscillations. This is especially useful if the receiver output is to be connected to a longer unshielded conductor wire which significantly increases state change discharge feedback to the receiver input.

Receiver, as described above, will output high state, preferably of the 5V (same as the operating voltage of the monostable pair) around 150 ns after the proper optical signal has entered the photo-detectors 201.

Figure 3:
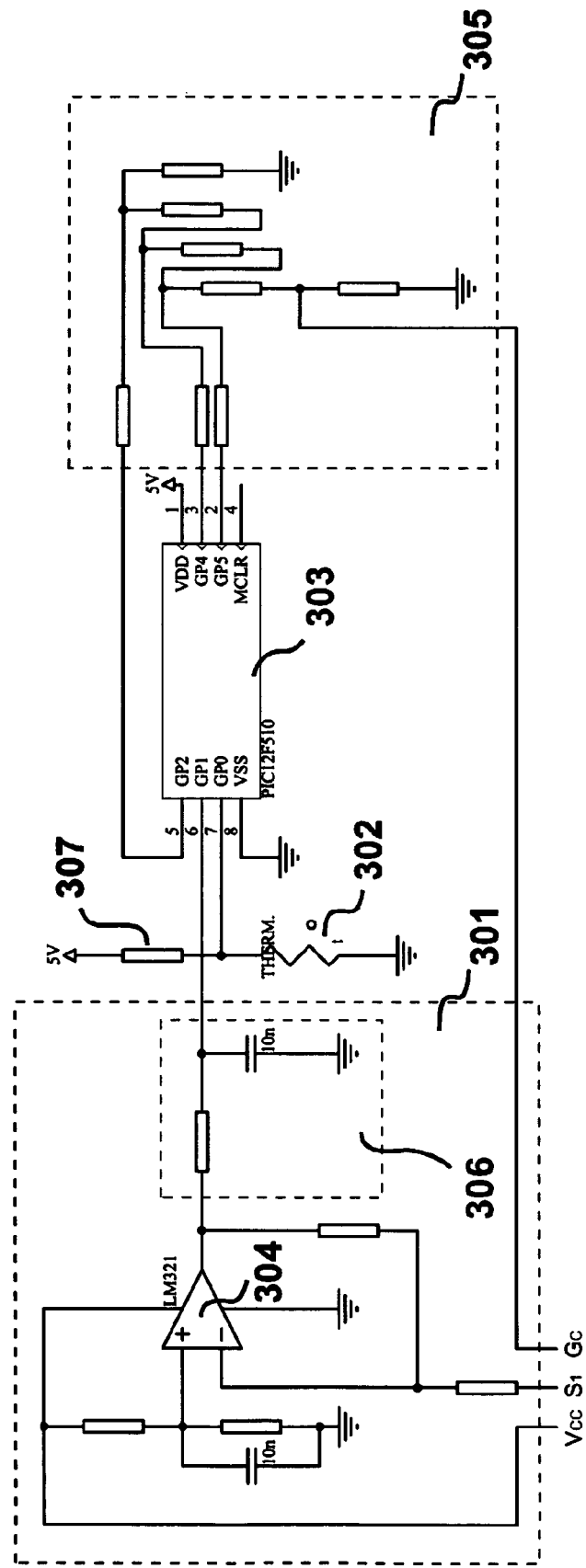
FIG. 3 shows a sun exposure signal conditioning circuit, a temperature sensor, the microcontroller and a digital to analog resistor converter circuit outputting a gain control line.

As shown on the FIG. 2 and FIG. 3. the photo-detectors 201 are also connected to the sun exposure filter and mirror circuit 301. A signal taken from the photo-detectors 201 contains an offset voltage that corresponds to the sun exposure level and superimposed on it the converted optical signal.

Sun exposure filter and mirror 301 is realized preferably by using the National LM321 amplifier 304 configured as shown on the FIG. 3. High value resistors in the feedback connection of the inverter amplifier 304 provide that almost no converted optical signal sinking and benefit of the low circuit current consumption. Resistor divider on the (+) input of the inverting amplifier 304 provides the voltage mirroring level.

Configured in the said manner the output of the inverting amplifier 304 has the voltage level of about 1V when the receiver is in the dark and when the background light or sunlight increases—output voltage linearly increases.

Sun light or surround light exposure detection in this configuration is simple bearing in mind that the light current (photocurrent) Ip of the photo-detectors 201 is a linear function of the incoming light intensity Ev that encounters said photo-detectors 201. Created light current produces proportional voltage drop on the bias resistor 202 which presents the offset voltage. The mirrored sun exposure signal is then applied preferably to the RC network 306 where the higher frequency of the sun exposure signal components are filtered out—in order to allow more accurate analog-to-digital (ADC) conversion. This signal $S_3$ is then applied to the microcontroller 303 ADC converter input GP1.

The temperature monitoring is preferably worked out with a thermistor 302—element such as the Murata NTC NCP15XW332 which has resistance value of 3.3 kΩ at room temperature and very stable temperature-to-resistance curve. However, any other type of PTC/NTC elements could be used as well. The thermistor 302 is biased to 5 V operating voltage by the thermistor biasing resistor 307 which takes part in creating the temperature voltage signal $T_{EMP}$. Thermistor biasing resistor 307 has high resistance value so the operating current is negligibly contributing to the raise of the thermistor 302 temperature. $T_{EMP}$ signal is applied to the microcontroller 303 ADC converter input GP0.

In other embodiment where a microcontroller posses only one ADC channel the temperature gain compensation can be realized by connecting a thermistor to the $G_C$ signal conducting line. Such connection with a series resistor added to the line would alter the $G_C$ signal according to the ratio of thermistor/resistor resistance and thus perform a temperature gain compensation. The other embodiments that may use a switching or multiplexing of the ADC, forms the standard solution for the mentioned problem.

The microcontroller 303 such as the Microchip PIC12F510 has two independent ADC channels that are used for converting the analog sun exposure signal and temperature signal to digital information that is lately stored to microcontroller 303 RAM memory registers.

The microcontroller 303 is programmed with an algorithm that compares the converted sun exposure and temperature inputs to the digital sun exposure and temperature limits stored in a database and counts consecutive occurrences of input values that reach the database limits. When recurrence count reaches pre-set limitations the microcontroller 303 established the corresponding digital gain control signal $G_C$ value from the database and applies it to the Digital-to-Analog converter (DAC) 305 inputs. Digital-to-Analog converter 305 is preferably formed in the standard inexpensive manner by using the resistor R-2R ladder network connected as shown in FIG. 3.

Thus, DAC 305 generate an output signal $G_C$ that corresponds to a digital output set by the microcontroller 303.

The second transistor 206 gate-2 voltage-to-gain curve is not linear—and it is necessary to calibrate and store voltage values applied to the transistor 206 gate-2 to have a linear gain control. Preferably, the potential of the gain control signal $G_C$ varies from 0V to 2.5V where 0V sets gain of the transistor to a minimum and 2.5V sets the maximum gain of the transistor. The resolution of the gain control signal $G_C$ depends on the reference voltage of the DAC and number of bits used to form the digital signal.

$$Resolution = \frac{Reference\_Voltage}{2^{nbits}}$$

Preferably, the reference voltage is 5V and is set by the operating voltage of the microcontroller 303. The number of bits is 3+1 where 1 is the most-significant-bit (MSB) that is permanently connected to a low signal 0V in order to the DAC output would range between 0V and 2.5 V (5V/2). Achieved gain control signal $G_C$ voltage resolution is then 0.3125V, i.e. ⅛ of the 2.5V, that provides good linearity of gain control.

Microcontroller 303 also sets the gain control signal $G_C$ depending on the algorithm result by direct controlling of the unit 203.

Figure 5:
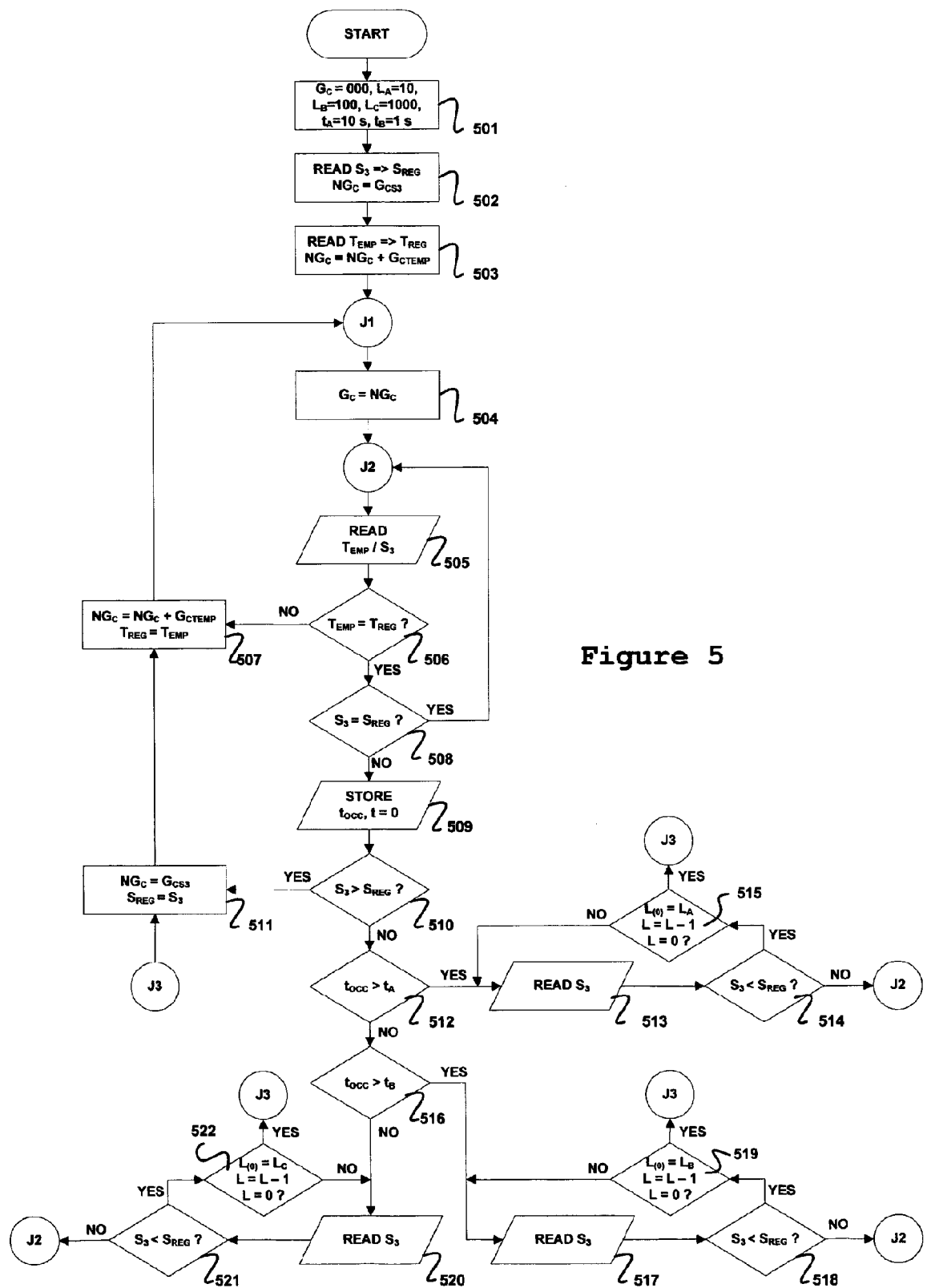
FIG. 5 discloses the flow chart describing the program algorithm of the microcontroller.

The logic of the algorithm is illustrated by the flow chart on FIG. 5. Said Microchip PIC12F510 microcontroller has available 38 8-bit registers that present the RAM memory.

Variables used by the program logic a located in the RAM registers. The microcontroller ROM memory is preferably used for storing the Program code, Database data and Constants and should be pre-programmed adequately.

All the Constants and the Database data used in the program logic are located in the said ROM memory locations.

Variables (V), Database data (D) and Constants (C) used in the flowchart have the following meaning:

| Name | Meaning; Kind |
|---|---|
| $G_C$ | gain control output; (V) |
| $S_3$ | digitalized measured sun exposure level; (V) |
| $S_{REG}$ | secondary register for comparing the $S_3$ value; (V) |
| $T_{EMP}$ | digitalized measured operating temperature; (V) |
| $T_{REG}$ | secondary register for comparing the $T_{EMP}$ value; (V) |
| $NG_C$ | new gain control value; (V) |
| $T_{OCC}$ | recurrence time of the $S_3$ value change; (V) |
| $L_A$ | loop A iterations limit; (C) |
| $L_B$ | loop B iterations limit; (C) |
| $L_C$ | loop C iterations limit; (C) |
| L | loop iteration counter; (V) |
| $t_A$ | limit A - the recurrence time of the $S_3$ value change; (C) |
| $t_B$ | limit B - the recurrence time of the $S_3$ value change; (C) |
| $G_{CS3}$ | corresponding database gain control value to the $S_3$ value; (D) |
| $G_{CTEMP}$ | corresponding database gain control modifier to the $T_{EMP}$ value; (D) |

The 8-bit timer counter unit in the microcontroller 303 is used for recording the event occurrences in time. The timer unit range is extended by an 8-bit prescaler in a way that the timer register increments on every 256th instruction cycle. Construction of the Microchip PIC12F510 microcontroller is such that one instruction cycle takes four periods of the crystal oscillator 106 signal—that is feeding the microcontroller 303.

Preferably, the clock frequency of the crystal oscillator 106 is adjusted to 4 MHz that results in one instruction cycle time of 1 μs and timer register incrementing every 256 μs. Range of the timer unit is additionally extended by an additional 8-bit RAM register which increments every time the timer register overflows and the resulting range of the timer is 16,777 seconds. Implementing a microcontroller with 16-bit, 32-bit or 64-bit RAM registers and timer units is also possible and it provides even greater timer range.

At start up the microcontroller 303 timer registers have value 0 and start incrementing on every instruction cycle as described earlier.

The start up routine of the microcontroller 303 program is given by the blocks 501, 502, 503 and 504.

The block 501, variable $G_C$—gain control output is set to a preselected value that represents the lowest possible gain setting. Preferably, $G_C$ is set to a binary value of 000. Setting the lowest possible gain setting at the beginning of the start up routine will ensure that no false triggering occurs at the receiver output in a case when circuit is exposed to a strong sun or a very low temperature and the microcontroller 303 has not yet performed measurement of the ambient conditions and adjustment of gain.

In block 501 also, the initial values of the constants $L_A$, $L_B$ and $L_C$—loop iterations limits are set, preferably to a decimal value of 10, 100 and 1000 respectively. Loop iteration limits present the number of times readout. The $S_3$ value will be compared in the respective loop area of the program logic.

There are three loop areas in the program logic and every area has one designated loop iteration limits $L_A$, $L_B$ and $L_C$ respectively. In block 501 the constants $t_A$ and $t_B$—limits the recurrence time of the $S_3$ value change, preferably to 10 and 1 seconds respectively. Limits on the recurrence time of the $S_3$ value change represent the decision mechanism of the gain control signal $G_C$ change. Limits define which of the three loops will be performed before and if proceeding to the gain control signal $G_C$ change.

Next, the program 502 reads out the initial $S_3$ sun exposure level and stores it in the $S_{REG}$ secondary register for comparing the $S_3$ value. Then the program 502 compares the read $S_3$ value to the database $S_3$ value limits and then finds and stores the $G_{CS3}$ corresponding database gain control value to the $S_3$ value into the $NG_C$—new gain control value register. Next, the program 503 reads out the initial $T_{EMP}$ temperature and stores it in the $T_{REG}$ secondary register for comparing the $T_{EMP}$ value. The program 503 compares the read $T_{EMP}$ value to the database $T_{EMP}$ value limits and modifies the $NG_C$ new gain control register value according to the $G_{CTEMP}$ corresponding database gain control modifier to the $T_{EMP}$ value. Finally, the value of $NG_C$ register is applied to the $G_C$ gain control output 504. Gain of the amplifier 203 is now set according to the database values $G_{CS3}$ and $G_{CTEMP}$ for the measured sun exposure $S_3$ and operating temperature $T_{EMP}$.

After the start up routine, the program enters an infinite loop consisting of blocks 505, 506 and 508. In this loop sun exposure level and operating temperature will be repeatedly measured and compared to the previously recorded values stored in the $S_{REG}$ and $T_{REG}$ registers. Change in the measured sun exposure level or operating temperature to the previous values will be detected and causes that other segments of the program logic to be performed, and if no change is detected than the loop continues to run indefinitely.

In detail—first, the program 505 reads out $T_{EMP}$ operating temperature and $S_3$ sun exposure level. If $T_{EMP}=T_{REG}$ 506, then the program continues to the sun exposure change test.

If $S_3=S_{REG}$ 508, then the program loops back to block 505 and the sensor data is read again. If $T_{EMP} \neq T_{REG}$ 506, then the $NG_C$ new gain control register value is again modified according to the $G_{CTEMP}$ corresponding database gain control modifier to the new $T_{EMP}$ value. Also the new $T_{EMP}$ value is entered into the $T_{REG}$ register and then the program loops back to block 504 where the value of $NG_C$ register is applied to the $G_C$ gain control output and the infinite loop continues. If $S_3 \neq S_{REG}$ 508, then time of the event is recorded (via block 509) into the $T_{OCC}$ recurrence time of the $S_3$ value change register, also the timer unit is reset to 0 so next $S_3$ value change event would be properly timed from the last event. If $S_3 > S_{REG}$ 510, then the new gain control value $NG_C$ is immediately written with new $G_{CS3}$ corresponding database gain control value to the $S_3$ value 511. In the block 511 the new $S_3$ value is entered into the $S_{REG}$ register and the program loops back to block 507.

When the sun exposure value $S_3$ rises it is necessary to immediately lower the gain of the amplifier 203—otherwise a higher sun exposure level will cause a higher noise peaks in the optical signal and thus lead to false triggering of the receiver output. The gain will be lowered according to the corresponding database gain control value to the new $S_3$ value to remain uninterrupted operation and optimal sensitivity.

If $S_3 \leq S_{REG}$ 510, then the $S_3$ value must be $\leq S_{REG}$ and the stored $T_{OCC}$ recurrence time of the $S_3$ value change is tested 512 against the preselected limit on the recurrence time $t_A$. Limits on the recurrence time of the $S_3$ value change perform the recognition of the ambient sun conditions. In case when the receiver is exposed to a strong daylight, measured $S_3$ value will be changing relatively often so the $T_{OCC}$ recurrence time of the $S_3$ value change will be very short. In such case $G_C$ gain control signal will not be increased immediately but after a loop of consecutive $S_3$ value measurements and tests that will reassure that the new sun exposure condition indeed allows the $G_C$ to be raised. If this step is not correctly performed then often changes in the $G_C$ gain control signal that would result would increase the probability of false triggering of the receiver by the noise peaks.

If $T_{OCC} > t_A$ 512, then the reassuring loop with $L_A$ iterations limit is performed which consists of blocks 513, 514 and 515. The $S_3$ sun exposure level is read in block 513, and if $S_3 < S_{REG}$, block 514, then the loop iterations counter that begun with the $L_A$ iterations limit is decremented and is tested on reaching the zero value L=0? 515. When L=0 the program loops to block 511 which performs $G_C$ gain control change. While L≠0 the reassuring loop continuous to the block 513. If at any time during the reassuring loop $S_3 \geq S_{REG}$ 514, then the loop exits to the block 505 and the loop counter is reset to $L_A$ iterations limit.

If $T_{OCC} \leq t_A$ 512, then $T_{OCC}$ is tested to $t_B$ limit (block 516).

If $T_{OCC} > t_B$ 516, then the reassuring loop with $L_B$ iterations limit is performed which consists of blocks 517, 518 and 519. The $S_3$ sun exposure level is read 517, and if $S_3 < S_{REG}$ 518, then the loop iterations counter that begun with the $L_B$ iterations limit is decremented and is tested on reaching the zero value L=0? 519. When L=0 the program loops to block 511 which performs $G_C$ gain control change. While L≠0 the reassuring loop continuous to the block 517. If at any time during the reassuring loop $S_3 \geq S_{REG}$ 518, then the loop exits to the block 505 and the loop counter is reset to $L_B$ iterations limit.

If $T_{OCC} \leq t_B$ 516, then the reassuring loop with $L_C$ iterations limit is performed that consists of blocks 520, 521 and 522. The $S_3$ sun exposure level is read 520, and if $S_3 < S_{REG}$ 521, then the loop iterations counter that begun with the $L_C$ iterations limit is decremented and is tested on reaching the zero value L=0? 522. When L=0 the program loops to block 511 which performs $G_C$ gain control change. While L≠0 the reassuring loop continuous to the block 520. If at any time during the reassuring loop $S_3 \geq S_{REG}$ 521, then the loop exits to the block 505 and the loop counter is reset to $L_C$ iterations limit.

By analysing of the usual sun exposure conditions on a bright day, cloudy day, during the night and all of the cases in different temperature conditions actually led to the construction of program logic with an infinite loop of $S_3$ and $T_{EMP}$ measurements, by adjusting the $G_C$ according to the corresponding database values and three reassuring loops that prevent unnecessary $G_C$ adjustments when specific ambient conditions are detected. The values of the $t_A$ and $t_B$ limits on the $T_{OCC}$ as well as the $L_A$, $L_B$ and $L_C$ iterations limits have been determined by the experiment for use as a LIDAR beam detector. For every other specific uses of the receiver it should be amended according to the statistics of the sun exposure variation for that specific use.

In an alternative embodiment, the absolute value of the $S_3$ value change could be monitored beside the $T_{OCC}$ recurrence time of the $S_3$ value change monitoring. The absolute step of the $S_3$ value change will statistically be greater in the strong sun conditions than in the cloudy or night ambient. At night the headlights of passing vehicles or other artificial lighting that usually have low intensity will cause only slight fluctuations of the $S_3$ value while at daylight direct sunlight or its reflections entering the receiver will cause sudden and great increases and decreases in the $S_3$ value. This could alternatively be used to detect the ambient conditions more precisely.

The absolute step of the $S_3$ value change is not analysed in the preferred embodiment of the receiver circuit but this could be achieved by developing the microcontroller program code further.

It should be understood that the invention is not limited by the embodiment described above, but is defined solely by the claims.

The invention claimed is:

1. A pulsed-laser beam detector with improved sun and temperature compensation, comprising:
   a plurality of photo detectors, an ambient temperature sensor,
   a sun exposure filter and mirroring circuit,
   a microcontroller unit that comprises pre-stored values in the database and an algorithm-decision logic,
   a time base circuit that feeds the microcontroller unit,
   an amplifier with an adjustable gain,
   a threshold setting circuit, a peak detector circuit,
   a comparator circuit, and
   a noise cancellation circuit,
   wherein, the gain of the amplifier is adjustable to predetermined values, and where said gain depends on the measured values from the plurality of detectors, and the temperature sensor, that are compared with values already stored in the microcontroller unit and subjected to the program logic stored in said microcontroller unit that determines the gain of the amplifier in real time.

2. The pulsed-laser beam detector as in claim 1, wherein, respective signals from the plurality of photo detectors are preprocessed via the filter and mirroring circuit before being taken by the microcontroller, and where the real-time amplified signal from the amplifier is post processed simultaneously by the threshold setting circuit and the peak detector circuit, and the two signals enter the comparator circuit, and follow to the noise cancellation circuit that results with the finally processed signal from the detector.

3. The pulsed-laser beam detector as in claim 2, with the finally processed signal that depends on the stored values of the temperature and the surrounding light intensity stored in the database memory of the microcontroller, wherein the stored values are previously estimated empirically and stored for each detector circuit.

4. The pulsed-laser beam detector as in any of the preceding claims as the input unit for detecting, analyzing and processing of the pulsed laser beam greatly affected by the sun exposure or the changed ambient temperature.

5. A method for enhancing the sensitivity of a pulsed-laser beam detector by improving the sun and temperature compensation of the detector, the method comprising:
   amplifying a converted optical signal in a controllable gain amplifier which gain is controlled by a computing means,
   monitoring a sun exposure level by a photo-detector,
   monitoring an operating temperature by a temperature sensor,
   monitoring a time period between changes in the monitored sun exposure level by a time clock,
   storing in a database of the computing means pre-stored values of different sun exposure levels and temperature values and for each of said pre-stored values also having stored a corresponding gain control and gain modifier values,
   storing in the pre-stored memory of the computing means time limits on the observed time periods between changes in the monitored sun exposure levels,
   comparing the monitored sun exposure level and the operating temperature value with the pre-stored values in the database,
   selecting the corresponding gain control and gain modifier values and applying them to the amplifier gain control input,
   avoiding gain control alterations in cases when an observed time period between changes of the monitored sun exposure level is below recurrence time limits, by a computing means algorithm in real time.

* * * * *